United States Patent
McKenney

(10) Patent No.: US 10,697,370 B2
(45) Date of Patent: Jun. 30, 2020

(54) OIL SUPPLY ASSEMBLY FOR GAS TURBINE ENGINE

(71) Applicant: Rolls-Royce North American Technologies Inc., Indianapolis, IN (US)

(72) Inventor: Tony McKenney, Columbus, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 125 days.

(21) Appl. No.: 16/117,756

(22) Filed: Aug. 30, 2018

(65) Prior Publication Data

US 2020/0072125 A1    Mar. 5, 2020

(51) Int. Cl.
| | | |
|---|---|---|
| F02C 7/06 | (2006.01) | |
| F01D 9/06 | (2006.01) | |
| F01D 25/16 | (2006.01) | |
| F01D 25/20 | (2006.01) | |

(52) U.S. Cl.
CPC .............. F02C 7/06 (2013.01); F01D 9/065 (2013.01); F01D 25/16 (2013.01); F01D 25/20 (2013.01); F05D 2260/60 (2013.01); F05D 2260/98 (2013.01)

(58) Field of Classification Search
CPC .......... F01D 9/065; F01D 25/16; F01D 25/18; F01D 25/20; F05D 2260/98; F05D 2260/60; F05D 2260/602
USPC ........................................................ 184/6.11
See application file for complete search history.

(56) References Cited

U.S. PATENT DOCUMENTS

| | | | |
|---|---|---|---|
| 4,433,539 A | 2/1984 | Norris et al. | |
| 4,561,246 A | 12/1985 | Hovan | |
| 4,858,427 A | 8/1989 | Provenzano | |
| 5,107,676 A * | 4/1992 | Hadaway | ............... F01D 25/18 |
| | | | 184/6.11 |
| 5,489,190 A | 2/1996 | Sullivan | |
| 6,102,577 A | 8/2000 | Tremaine | |
| 7,568,843 B2 | 8/2009 | Lefebvre et al. | |
| 7,699,530 B2 | 4/2010 | Blais | |
| 8,210,316 B2 | 7/2012 | DiBendetto et al. | |
| 8,893,856 B2 | 11/2014 | Frost | |
| 8,997,500 B2 | 4/2015 | Glahn et al. | |
| 9,051,878 B2 | 6/2015 | Blewett et al. | |
| 9,695,714 B2 | 7/2017 | Olsen et al. | |
| 9,847,629 B2 | 12/2017 | Moisei et al. | |
| 2006/0249332 A1 | 11/2006 | Bruce | |
| 2011/0108360 A1 * | 5/2011 | DiBenedetto | ........... F01D 25/18 |
| | | | 184/6.11 |
| 2015/0052872 A1 * | 2/2015 | Zurmehly | ............. F01D 25/125 |
| | | | 60/39.08 |
| 2015/0096839 A1 * | 4/2015 | Craig | ........................ F02C 7/06 |
| | | | 184/6.1 |
| 2015/0315933 A1 | 11/2015 | Do et al. | |

(Continued)

OTHER PUBLICATIONS

Extended European Search Report, European Application No. 19191904. 2-1004, dated Apr. 6, 2020, 6 pages.

*Primary Examiner* — Ehud Gartenberg
*Assistant Examiner* — David P. Olynick
(74) *Attorney, Agent, or Firm* — Barnes & Thornburg LLP

(57) ABSTRACT

An oil supply system includes an oil supply assembly in a turbine engine. The assembly includes scavenge cavity and an oil supply tube located in and protected by a strut in the turbine engine to supply oil to a bearing chamber.

13 Claims, 2 Drawing Sheets

(56) References Cited

U.S. PATENT DOCUMENTS

2016/0340053 A1* 11/2016 Curlier .................. F01D 9/065
2018/0112598 A1    4/2018 Ricci
2018/0216493 A1    8/2018 Moniz et al.

* cited by examiner

OIL SUPPLY ASSEMBLY FOR GAS TURBINE ENGINE

FIELD OF THE DISCLOSURE

The present disclosure relates generally to an oil supply system for a gas turbine engine, and more specifically to an oil supply and scavenge assembly for one or more bearings of the gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. Stationary sump or bearing hub chambers are provided for mounting lubricated bearings and gears therein. Generally, there is a continuous flow of oil into and out of these chambers to lubricate the bearings or gears. Some oil supply designs have included oil supply pipes routed through hot nozzle guide vanes, hot structures, and near hot turbine disks in the gas turbine engine.

Oil supply pipes in these extreme conditions have increased risks of thinned wall deflections, cracks, and other rupture failures. When conventional oil supply pipes fail, they can result in oil leaking onto hot surfaces or spraying into hot areas where the oil can ignite resulting in fire and damage to the engine. The risk of an oil fire from a leak or other failure in a supply pipe is higher than other service pipes due to the pressurized oil inside. Accordingly, new configurations are needed to mitigate the heat and location risks associated with supplying oil to bearing chambers in gas turbine engines.

SUMMARY

The present disclosure may comprise one or more of the following features and combinations thereof.

According to an embodiment, an oil supply system for a gas turbine engine comprises an oil supply reservoir, a bearing chamber, and an oil supply assembly. The oil supply assembly interconnects the oil supply reservoir and the bearing hub chamber and has a strut having a scavenge cavity extending longitudinally along a length of the strut. The scavenge cavity houses an oil supply tube and an oil return tube in its interior and terminates in a fitting that opens into a scavenge pipe to return oil to the oil supply reservoir.

In some embodiments, each of the oil supply and oil return tubes terminate at a point where the scavenge cavity has a maximum diameter and the fitting extends partially into the scavenge cavity. The fitting further comprises an oil supply pipe that couples to the oil supply tube at one end and couples to the fitting via a seal component located between a flanged portion of the oil supply pipe and a surface of the fitting.

In some embodiments, the fitting includes an opening flush with a top surface of the fitting and the scavenge pipe is located below the opening so that all the fluid in the scavenge cavity is taken up by the scavenge pipe. The system includes a pump coupled to one of the scavenge pipe and the oil supply pipe.

In some embodiments, the oil supply tube and the oil return tube are positioned in parallel within the scavenge cavity. The oil supply tube has a double-walled tube with an inner tube, an outer tube and an insulative air-gap therebetween.

According to some embodiments, an oil supply assembly for a gas turbine engine comprises a strut with an interior scavenge cavity extending longitudinally in the interior of the strut defining a first diameter at an upper end and a second diameter at a lower end, an oil supply tube extending through the scavenge cavity and an oil return tube extending through the scavenge cavity, and a scavenge pipe fitting. The scavenge pipe fitting is configured to couple to the second diameter at the lower end of the strut, the fitting having a scavenge pipe coupled to the fitting in spaced apart relation to the oil return tube so that any oil that escapes from the oil supply tube, along with oil in the return tube is removed from the strut via the scavenge pipe.

In some embodiments, the second diameter is greater than the first diameter. The scavenge pipe fitting further includes an oil supply pipe that extends through the fitting, into the scavenge cavity and is coupled to the oil supply tube. The oil supply pipe comprises a flange extending around an exterior of the pipe, and a sliding seal positioned between the flange and the scavenge pipe fitting to provide a sliding surface of the oil supply pipe within the strut.

In some embodiments, the oil supply tube and the oil return tube are positioned in parallel within the scavenge cavity. The oil supply tube comprises a double-walled tube with an inner tube, an outer tube and an insulative air-gap therebetween.

In some embodiments, the oil return tube comprises a double-walled tube with an inner tube, an outer tube and an insulative air-gap therebetween. The oil supply and oil return tubes terminate at a point where the scavenge cavity has a maximum diameter and the fitting extends partially into the scavenge cavity.

These and other features of the present disclosure will become more apparent from the following description of the illustrative embodiments.

DETAILED DESCRIPTION OF THE DRAWINGS

Figure 1:
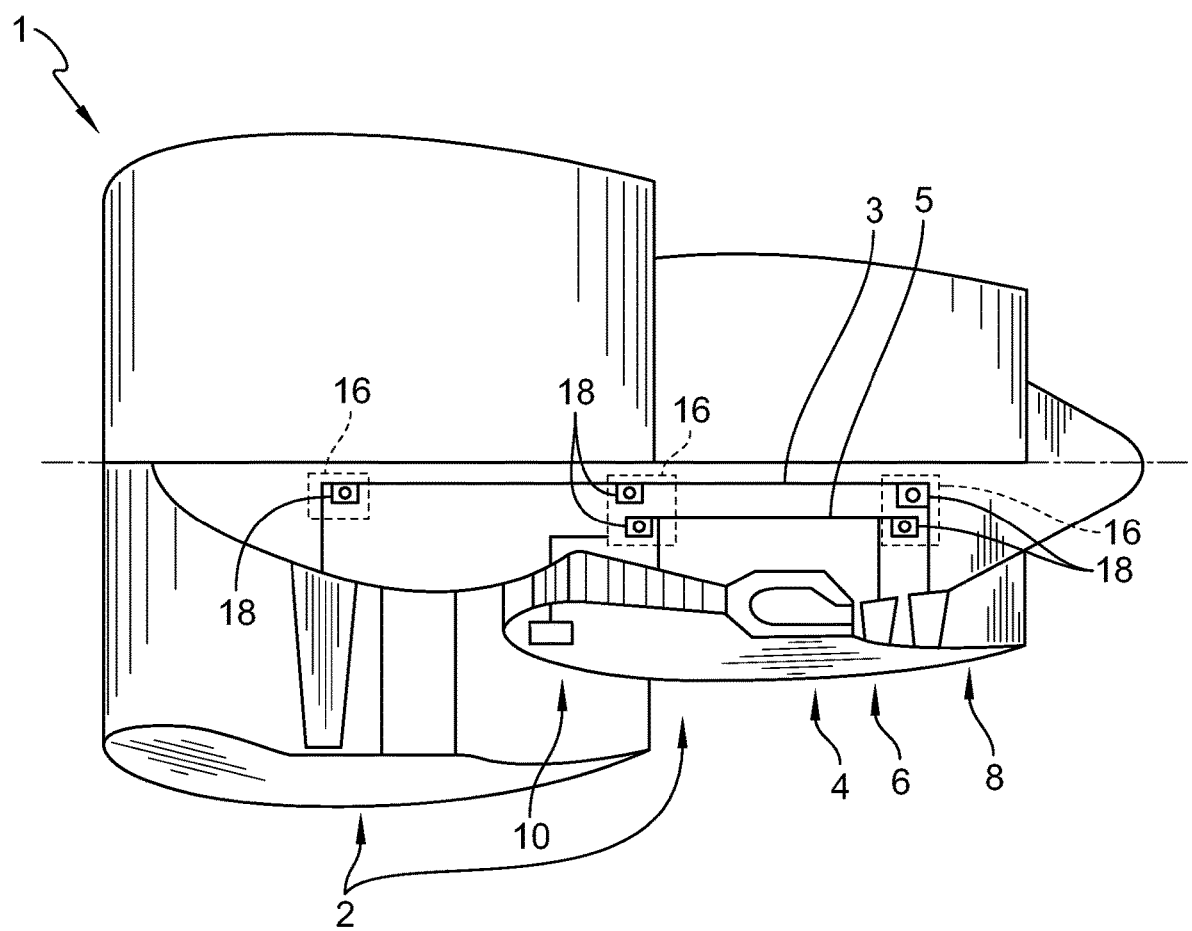
FIG. 1 is a perspective partial cut-away view of a turbine engine showing the engine includes a plurality of bearing hub chambers positioned longitudinally along the rotor axis and an integrated oil supply system in communication with one of the bearing hub assemblies.

For the purposes of promoting an understanding of the principles of the disclosure, reference will now be made to a number of illustrative embodiments illustrated in the drawings and specific language will be used to describe the same.

FIG. 1 illustrates a gas turbine engine 1, including a compressor 2, combustor 4 and turbine sections 6, 8. Shafts 3, 5 interconnect turbine sections 6, 8 with compressor sections 2, which shafts are supported via bearings 18 in respective bearing chambers 16. Bearings 18 in a chamber 16 may be lubricated with oil via an oil supply system 10, which provides for supply and removal of the oil from the bearing chamber 16. Oil supply system 10 may be a closed system that interconnects from the casing to the chamber across a fluid flow path in the turbine engine as described in FIG. 2.

Figure 2:
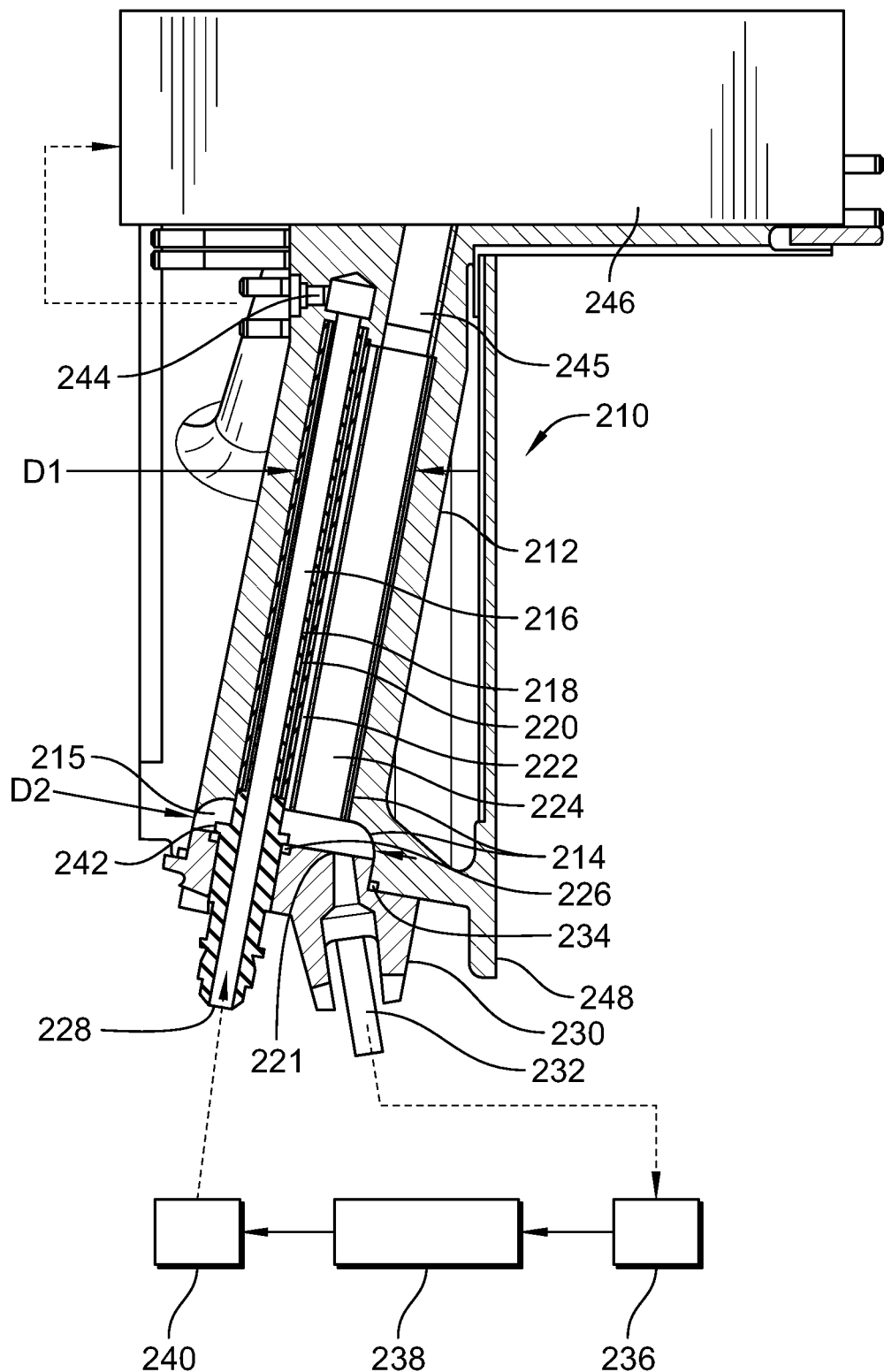
FIG. 2 is a close-up sectional view of a portion of the turbine of FIG. 1 showing the integrated oil supply system with an oil supply assembly included in a strut of the engine.

An oil supply system 210 is illustrated in FIG. 2. The oil supply system comprises a bearing hub chamber 246, an oil supply reservoir 238, and an oil supply assembly 210 interconnecting the chamber 246 and the reservoir 238. The system 210 may optionally include one or more pumps 240, 236 coupled to inputs and outputs of the reservoir 238 to pump oil into and remove oil from the bearing hub chamber 246. Oil supply assembly 210 may include a strut 212 with a scavenge cavity 214, an oil supply tube 216 and an oil return tube 224 extending in parallel along a length of the scavenge cavity 214. Supply assembly 210 terminates a fitting 232 at a radially exterior location along the strut 212.

Scavenge cavity 214 may include a first length in the strut 212 that has a first diameter D1, and a second length in the strut 212 that has a second, relatively larger diameter D2, 215. Scavenge cavity 214 may be integrally formed in strut 212 or may be a tube component inserted to extend through interior of strut 212. Fitting 230 may be coupled to the strut 212 via a sliding seal 234 so that a portion of the fitting 230 extends within the second larger diameter portion of the scavenge cavity 214. At an end of the strut 212 opposite of, and radially interior to the fitting 230, first ends of oil supply tube 244 and oil return tube 245 are coupled to the bearing hub chamber 246 to supply and remove oil to one or more bearings in the chamber 246.

Each of oil supply tube 216 and oil return tube 224 may extend in parallel along the length of the scavenge cavity 214 having the first diameter D1 and terminate at approximately a transition in the cavity 214 to the second diameter D2. In some embodiments, oil return tube 224, may terminate at any point along the strut scavenge cavity 214 prior to the transition to the second diameter. Oil supply tube 216 and oil return tube 224 may be positioned in spaced-apart relation to the longitudinally extending wall of scavenge cavity 214 to minimize thermal heat transfer. Oil supply tube 216 may be a double-walled oil supply tube 216 having an inner tube wall, 218, an outer tube wall 222 and a gap 220 forming an air space between the inner tube wall 218 and the outer tube wall 222. Although described in terms of the oil supply tube 216, any combination of the oil supply tube 216, oil return tube 224 and scavenge cavity 214 may have this double-walled air gap formation, which performs as a heat shield.

Fitting 230 may include an oil supply pipe 228 and a scavenge pipe 232. Oil supply pip 228, may extend completely through an opening 241 in the fitting to couple to the second end of oil supply tube 216. In some embodiments, oil supply pipe includes a sliding seal 226 positioned between a radially extending wear flange 242 of the oil supply pipe 228 and the fitting 230. The sliding seal 234 may be a metal c-seal configured to prevent stresses to the oil supply pipe 228 by locating the pipe in the fitting 230 while allowing oil supply pipe 228 to slide relative to the fitting 230 during expansion and contraction of supply pipe 228 and supply tube 216 within the strut due to temperature changes. In some embodiments, supply pipe 228 and supply tube 216 may be unitarily formed as a single component.

Scavenge pipe 232 may be formed to extend partway through the fitting 230. Fitting may further include a scavenge pipe opening 221 that opens into the scavenge cavity 214. Scavenge pipe opening 221 is located in spaced apart position relative to the second end of the oil return tube 224 so that oil exiting the oil return tube 224 oil from any other location in the strut 212 collects in the scavenge cavity 214 and exits through the scavenge pipe opening 221 into the scavenge pipe 232 to return to the reservoir 238. In this manner, any crack, or failure in oil supply or return tubes will result in oil collecting in a relatively cooler scavenge chamber second diameter area and being removed from scavenge pipe 232. Further, scavenge and oil return pipes frequently have lower pressure inside the pipe than the surrounding air pressure. Therefore, a crack to the scavenge chamber or vent pipes will result in secondary cooling system air entering the pipe or scavenge cavity 214. Although oil supply assembly is disclosed in situ relative to a bearing chamber, it can be used as part of any engine lubrication system.

The risk of an oil fire from a leak in the supply pipe is higher than the other service pipes due to the pressurized oil inside. The bearing hub scavenge pipe and vent pipes often have a lower pressure inside each pipe than the surrounding air pressure. A crack in scavenge and vent pipes is likely to allow secondary cooling system air into the pipe instead of oil leaking from the pipe. Therefore, the risk of oil leaks from these pipes is lower than the oil supply tube. By placing the oil supply pipe within the scavenge pipe cavity, a leak in the pressurized oil supply tube will go into a safer zone where it is cooler. Leaked supply oil will be safely removed from the hot areas by the oil scavenge system thereby reducing the risk of an oil fire in the engine. An additional risk reduction feature of the disclosed system is locating the supply and return, or scavenge, tubes within a structural strut. The structural strut provides protection for these service tubes from thermal heat transfer and from handling damage. A small gap is maintained between the strut inner wall and the service tubes to keep heat transfer to a minimum. This results in lower temperature tubes that are less likely to fail. Another risk reduction feature allows the service tubes to freely expand and contract along their length within the strut with changing temperatures experienced by the tubes by utilizing a seal feature that supports and locates the tubes in the strut while allowing them to slide.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An oil supply system for a gas turbine engine comprising:
   an oil supply reservoir,
   a bearing chamber, and
   an oil supply assembly interconnecting the oil supply reservoir and the bearing chamber, the oil supply assembly having a strut having a scavenge cavity extending longitudinally along a length of the strut, the scavenge cavity housing an oil supply tube and an oil return tube in its interior and terminating in a fitting that opens into a scavenge pipe to return oil to the oil supply reservoir wherein each of the oil supply and oil return tubes terminate at a point where the scavenge cavity has a maximum diameter and the fitting extends partially into the scavenge cavity.

2. The oil supply system of claim 1, wherein the fitting further comprises an oil supply pipe that couples to the oil supply tube at one end and couples to the fitting via a seal component located between a flanged portion of the oil supply pipe and a surface of the fitting.

3. The oil supply system of claim 1, wherein the fitting includes an opening flush with a top surface of the fitting and the scavenge pipe is located below the opening so that all the fluid in the scavenge cavity is taken up by the scavenge pipe.

4. The oil supply system of claim 3, further comprising a pump coupled to one of the scavenge pipe and the oil supply pipe.

5. The oil supply system of claim 1, wherein the oil supply tube and the oil return tube are positioned in parallel within the scavenge cavity.

6. The oil supply system of claim 1, wherein the oil supply tube comprises a double-walled tube with an inner tube, an outer tube and an insulative air-gap therebetween.

7. An oil supply assembly for a gas turbine engine comprising:
- a strut with an interior scavenge cavity extending longitudinally in the interior of the strut defining a first diameter at an upper end and a second diameter at a lower end,
- an oil supply tube extending through the scavenge cavity and an oil return tube extending through the scavenge cavity, and
- a scavenge pipe fitting configured to couple to the second diameter at the lower end of the strut having a scavenge pipe coupled to the scavenge pipe fitting in spaced apart relation to the oil return tube so that any oil that escapes from the oil supply tube, along with oil in the return tube is removed from the strut via the scavenge pipe wherein each of the oil supply and oil return tubes terminate at a point where the scavenge cavity has a maximum diameter and the scavenge pipe fitting extends partially into the scavenge cavity.

8. The oil supply assembly of claim 7, wherein the second diameter is greater than the first diameter.

9. The oil supply assembly of claim 7, wherein the scavenge pipe fitting further comprises an oil supply pipe that extends through the scavenge pipe fitting, into the scavenge cavity and is coupled to the oil supply tube.

10. The oil supply assembly of claim 9, wherein the oil supply pipe comprises a flange extending around an exterior of the pipe, and a sliding seal positioned between the flange and the scavenge pipe fitting to provide a sliding surface of the oil supply pipe within the strut.

11. The oil supply assembly of claim 7, wherein the oil supply tube and the oil return tube are positioned in parallel within the scavenge cavity.

12. The oil supply assembly of claim 7, wherein the oil supply tube comprises a double-walled tube with an inner tube, an outer tube and an insulative air-gap therebetween.

13. The oil supply assembly of claim 7, wherein the oil return tube comprises a double-walled tube with an inner tube, an outer tube and an insulative air-gap therebetween.

* * * * *